Oct. 18, 1966  S. W. BRIGGS  3,279,614
FILTER AND CENTER TUBE
Filed Aug. 27, 1963
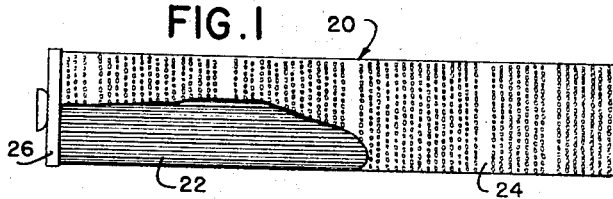
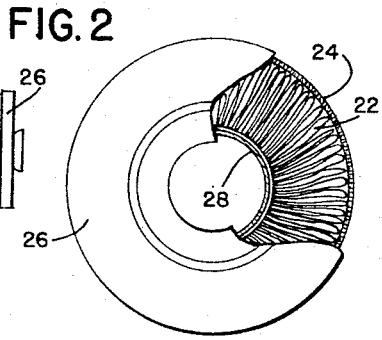
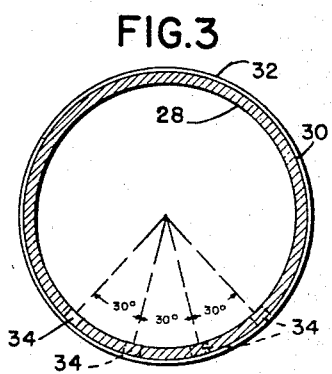
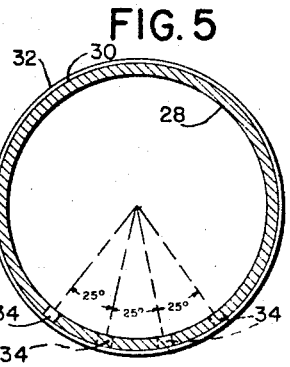
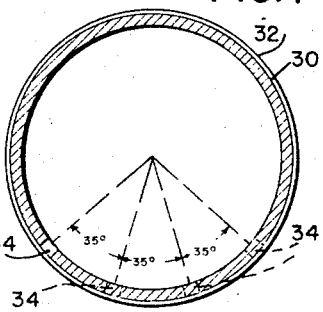
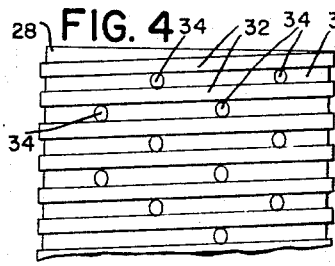
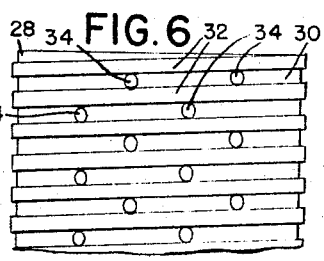
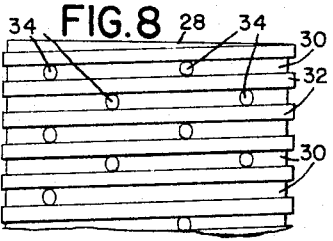
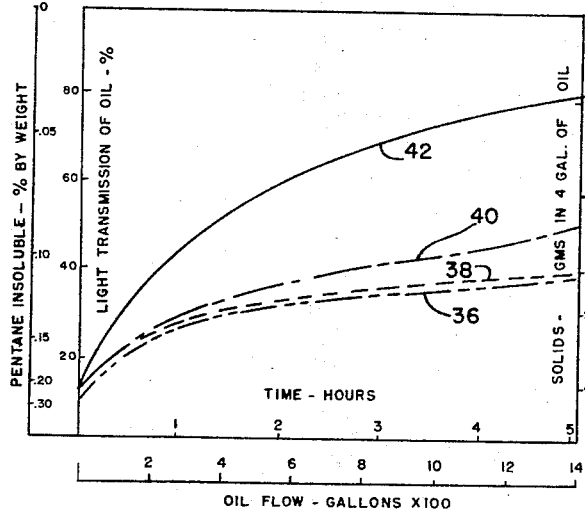
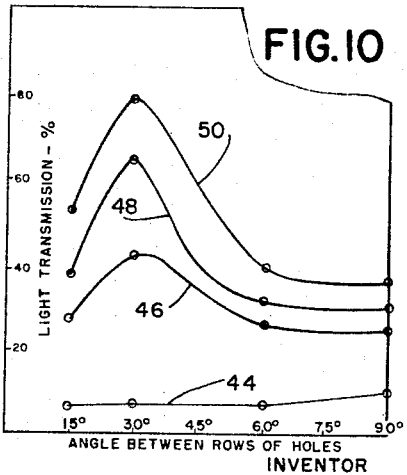
INVENTOR
SOUTHWICK W. BRIGGS
BY Raymond W. Colton
ATTORNEY United States Patent Office 3,279,614
Patented Oct. 18, 1966

3,279,614
FILTER AND CENTER TUBE
Southwick W. Briggs, 6420 Western Ave., Chevy Chase, Md. (% Stone Filter Corp., 900 Franklin St. NE., Washington, D.C.)
Filed Aug. 27, 1963, Ser. No. 304,841
14 Claims. (Cl. 210—457)

This invention relates to a filter and a center tube construction by virtue of which, advantages over existing products have been achieved.

In connection with conventional practice, the center tube of a filter is substantially uniformly perforated throughout its circumference so as to promote a substantially uniform flow throughout the circumference of the filter during its entire life.

Paradoxical as it may seem, it has been proven by extensive testing, that by confining the openings in the center tube of a filter to a sector or zone smaller than the entire circumference of the center tube, improved filtration is realized, and for a prescribed requirement, the cost of material can be reduced.

It is among the objects of this invention to provide a filter comprising a center tube, a perforated cover member surrounding the center tube and spaced therefrom, and a filter medium interposed between the center tube and the cover member, the center tube containing peripheral openings arranged predominantly within a sector of from 75° to 120°. The invention is particularly applicable where the filter medium is composed of paper pleated to define inner and outer folded edges contacting the center tube and cover member respectively, exemplified by U.S. Patent 2,919,807, dated January 5, 1960. Outstanding results have been achieved where the sector is substantially 90°. The openings are preferably arranged in rows, with adjacent rows being spaced from 20° to 45° apart. Particularly good results have been achieved in accordance with the present invention where the center tube is circumferentially grooved to define wall portions of reduced thickness, with the openings extending through these wall portions. Whereas such grooves may be annular, helical grooves have been employed to great advantage. It is preferred that there be at least three axial rows of openings and where it is desirable to preserve the strength of the center tube, circumferentially adjacent openings are preferably spaced by at least two axial rows.

Whereas the invention is applicable to center tubes composed of any material, center tubes composed of impregnated paper have been utilized primarily in the tests conducted thus far. According to the test data compiled thus far, exceptionally good results have been achieved where the openings in the center tube are disposed in four rows approximately 30° apart.

It appears that the portion of the filter medium adjacent the imperforate zone or sector of the center tube passes the oil or other liquid undergoing filtration at a slower rate than that portion of the filter medium lying adjacent the perforate zone or sector of the center tube. The aggregate perforated area of the center tube will satisfy the full flow requirement of the filter at the beginning of its operation. Because of the reduced rate of flow through the filter medium adjacent the imperforate zone or sector, it filters more effectively during the initial operation of the filter. Then, as the filter cake builds up on the portion of the filter medium adjacent the perforated zone or sector of the center tube, the flow rate in this zone diminishes and the portion of the filter medium adjacent the imperforate sector of the center tube accommodates a relatively greater proportion of the flow.

It has been found that the present invention makes it possible to utilize a pleated paper filter medium composed of paper weighing 180 lbs. per ream to perform so as to satisfy conditions that previously required a much heavier paper of the order of 300 lbs. per ream.

A more complete understanding of the invention will follow from a description of the accompanying drawings wherein:

FIG. 1 is an elevation, partially broken away, depicting a pleated paper filter;

FIG. 2 is an elevation, partially broken away, and on an enlarged scale, depicting a pleated paper filter similar to that of FIG. 1;

FIG. 3 is a sectional elevation of a center tube depicting one form of the present invention;

FIG. 4 is a fragmentary side elevation of the center tube of FIG. 3;

FIG. 5 is a sectional elevation depicting a modification;

FIG. 6 is a fragmentary side elevation of the center tube of FIG. 5;

FIG. 7 is a sectional elevation depicting another modification;

FIG. 8 is a fragmentary side elevation of the center tube of FIG. 7;

FIG. 9 is a curve sheet illustrating performance characteristics achieved by the present invention; and FIG. 10 is a curve sheet illustrating the effect of the arrangement of openings on the performance of filters embodying the present invention.

FIG. 1 depicts a pleated paper filter 20 having a pleated paper filter medium 22, a perforated cover member 24 and end caps 26. As shown in FIG. 2, the inner folds of the pleated paper medium contact the lands of a grooved center tube 28, and the outer folds are embraced by the perforated cover member 24.

The center tube depicted in FIG. 3 and FIG. 4 contains an external helical groove 30 defining lands 32 on which the inner folds of the pleated paper medium 22 of FIG. 2 are supported. Four rows of openings 34 extend axially of the center tube, as shown in FIG. 4 and are spaced 30° apart as indicated in FIG. 3. It will be evident from FIG. 4 that circumferentially adjacent openings are spaced by at least two rows so as not to impair unduly the strength of the center tube, which may be composed of paper impregnated with a suitable resin, such as phenolformaldehyde. It will be evident that the openings in this form of the invention lie substantially within a zone or sector of 90°.

The form of the invention depicted in FIGS. 5 and 6 differs from that of FIGS. 3 and 4 in that the rows of openings are spaced only 25° apart and the total zone or sector containing the openings extends over an arc of only 75°.

The form of the invention depicted in FIGS. 7 and 8 differs from that of FIGS. 3 and 4 only in having the four rows of openings extend over an arc of 105° with the rows 35° apart.

The outstanding results achieved in accordance with the present invention will be evident from a study of the curves depicted in FIGS. 9 and 10. The curve 36 of FIG. 9 depicts the results achieved with a pleated paper filter having a center tube conventionally perforated with four rows of openings spaced 90° apart throughout the circumference of the tube. Curve 38 depicts the performance of a filter differing from that identified by the curve 36, solely by having a different arrangement of openings in the center tube. The curve 38 depicts the performance with a center tube having four rows of openings extending over a sector of 180° with the rows 60° apart.

Curve 40 represents the performance of a filter differing from the others solely by the arrangement of openings in the center tube wherein they extend over a total sector of 45° with the rows 15° apart.

A filtering differing from the others solely by the arrangement of openings in the center tube has produced the curve 42 where the openings are arranged in four rows, 30° apart, so that the entire sector occupied by the openings is substantially 90° as illustrated in FIGS. 3 and 4. An examination of the curve 42 of FIG. 9, particularly as compared with the curve 36 representing the conventional arrangement of holes, is immediately indicative of the advantages accruing from the present invention. The light transmission of the oil undergoing filtration increases rapidly. The pentane insoluble components of the oil are reduced rapidly. And the total solids remaining in the oil are reduced rapidly.

The curves of FIG. 10 illustrate the relative effects on filter performance produced by various spacings between adjacent rows of openings where four such rows are utilized. The curve 44 indicates the initial light transmission of the oil prior to any filtration. The curve 46 depicts the light transmission of the oil for each arrangement of row displacement after filtration had proceeded for one hour. The curve 48 depicts the results after two and one half hours. The curve 50 depicts the results after five hours of filtration. It is evident that outstanding results are produced where the spacing of the rows of openings approximates 30° and that a preferred range of such spacing extends from about 20° to about 45°.

Whereas the present invention has been described with reference to a relatively few examples, many variations that will be suggested to those skilled in the art are contemplated as coming within the scope of the appended claims.

What is claimed is:

1. A filter comprising a center tube, a perforated cover member surrounding said center tube and spaced therefrom, and a filter medium interposed between said center tube and cover member, said center tube containing peripheral openings arranged predominantly within a sector of from 75° to 120°.

2. A filter according to claim 1 wherein said filter medium is composed of paper pleated to define inner and outer folded edges contacting said center tube and cover member respectively.

3. A filter according to claim 1 wherein said sector is substantially 90°.

4. A filter according to claim 1 wherein said openings are arranged in rows, adjacent rows being between 20° and 45° apart.

5. A filter according to claim 1 wherein said tube is circumferentially grooved defining wall portions of reduced thickness, and said openings penetrate said wall portions.

6. A filter according to claim 1 wherein said tube contains a helical groove and said openings intersect said groove.

7. A filter according to claim 1 wherein said openings are arranged in at least three axial rows.

8. A filter according to claim 7 wherein circumferentially adjacent openings are spaced by at least one axial row.

9. A filter center tube containing a plurality of peripheral openings along its length, said openings lying predominantly within a sector of from 75° to 120°, said tube being circumferentially grooved defining wall portions of reduced thickness containing said openings.

10. A filter center tube according to claim 9 wherein said center tube is composed of impregnated paper.

11. A filter center tube according to claim 9 wherein said sector is substantially 90°.

12. A filter center tube according to claim 9 wherein said tube is grooved helically.

13. A filter center tube according to claim 12 wherein said openings are disposed in at least three axial rows between 20° and 45° apart.

14. A filter center tube according to claim 9 wherein said openings are disposed in four rows approximately 30° apart.

References Cited by the Examiner

UNITED STATES PATENTS

| Re. 7,845 | 8/1877 | Bancroft | 239—567 X |
| 648,263 | 4/1900 | Hull. | |
| 2,919,807 | 1/1960 | Briggs | 210—493 X |

FOREIGN PATENTS

| 605,024 | 2/1926 | France. |
| 933,420 | 12/1947 | France. |

REUBEN FRIEDMAN, *Primary Examiner.*

D. M. RIESS, *Assistant Examiner.*